Fig. 3  Fig. 4  Fig. 5  Fig. 6  Fig. 7

INVENTOR.
FRED H. BOGART
BY Hudson, Boughton,
Williams, David & Hoffmann.
ATTORNEYS July 18, 1950  F. H. BOGART  2,515,329
POWER CHUCK WRENCH Filed July 30, 1948  5 Sheets-Sheet 5

INVENTOR.
FRED H. BOGART
BY Hudson, Boughton,
Williams, David & Hoffmann
ATTORNEYS Patented July 18, 1950

2,515,329

UNITED STATES PATENT OFFICE 2,515,329

POWER CHUCK WRENCH

Fred H. Bogart, South Euclid, Ohio, assignor to The Warner & Swasey Company, Cleveland, Ohio, a corporation of Ohio Application July 30, 1948, Serial No. 41,640

27 Claims. (Cl. 279—4)

This invention relates to a machine tool and, more particularly, to an improved means of actuating a power member employed for operating the chuck of a machine tool.

Machine tools are frequently provided with a power-operated member for actuating the jaws of the chuck to and from work-gripping position. Since the machine tool may be employed to machine a wide variety of stock ranging from solid bars to relatively thin-walled tubes, it is essential that the power member be capable of operating the jaws of the chuck to effect a range of predetermined work-gripping pressures in order that the work may be firmly held without injury.

One mode of effecting this result is to employ a friction clutch in the member actuating mechanism intermediate its power drive and the means for effecting movement of said member, the pressure with which the friction members of the clutch are engaged being adjustable so that the latter will slip when the jaws of the chuck have been tightened to a predetermined extent. Since a friction clutch generally employs a lever or levers for effecting engagement of the friction members, the pressure of engagement may be controlled by rocking the lever or levers different amounts. When the friction members of the clutch are new this expedient works satisfactorily since a predetermined rocking movement of the clutch-engaging lever or levers produces a torque transmission of known amount. But as the friction members wear, the lever or levers must be moved greater distances to effect torque transmissions equivalent to those obtained with lesser movement of the lever or levers when the friction members are new. Consequently, the clutch-actuating mechanism must be frequently adjusted and in the intervals between such adjustments the work-gripping pressures exerted by the chuck become progressively inaccurate. Furthermore, it has been found that when the jaws of a chuck have been tightened to exert a predetermined pressure upon a workpiece, and the latter is then machined, a greater force is required to open the chuck than that utilized to effect closing thereof. Hence, the power member cannot open the chuck unless the friction members of the clutch be engaged under greater pressure than employed for effecting closing thereof. When conventional friction clutches and clutch-operating mechanisms are employed, this feature necessitates a resetting of the clutch-operating mechanism for each opening and closing operation of the chuck which is an obvious disadvantage especially when successive pieces of stock of the same size and type are to be machined, since the chuck should be operated to exert the same work-gripping pressure for each succeeding piece of stock.

An object of this invention is to provide an improved operating mechanism for a friction clutch of a machine tool power operated chuck actuating member, the clutch-engaging pressure of which mechanism is automotically increased when the member is actuated to effect chuck opening and without altering the setting of the mechanism for effecting a predetermined work-gripping pressure by the chuck.

Another object of the invention is to provide an improved operating mechanism for the friction clutch of a machine tool power operated chuck actuating member, the said mechanism having means for exerting a range of predetermined clutch-engaging pressures to provide a corresponding range of work-gripping pressures for the chuck which is operated by the member, the said means being so constructed and arranged that automatic compensation for wear of the friction members of the clutch is effected with the result that the work-gripping pressures are not altered by said wearing, and the said mechanism also including a means for automatically increasing the clutch-engaging pressure when the member is actuated to effect chuck opening without altering the setting of the mechanism for effecting the predetermined work-gripping pressure of the chuck.

A further object of the invention is the provision of an improved operating mechanism for a power operated chuck actuating member as set forth in the preceding object and in which the means for automatically increasing the chuck-engaging pressure includes a fluid-pressure actuated mechanism which is controlled by the means for operating the actuating member in the direction for effecting work release by the chuck.

A still further object of the invention is the provision of an improved operating mechanism for a power operated chuck actuating member as set forth in the two preceding objects and in which the means for exerting a range of clutch-engaging pressures includes a fluid-actuated mechanism and an adjustable valve organization which is settable to effect a desired work-gripping pressure by the jaws of the chuck.

An additional object of the invention is the provision of an improved operating mechanism for the friction clutch of a machine tool power operated chuck actuating member, the said mechanism including a cooperating spring and lever for exerting a range of predetermined clutch-engaging pressures to provide a corresponding range of work-gripping pressures for the chuck which is actuated by the actuating member, the said spring and lever being so constructed and arranged as to automatically compensate for wear of the friction members of the clutch so that the predetermined work-gripping pressures are not altered by said wear, the said mechanism also including an electromagnetic means for automatically increasing the clutch-engaging pressure when the member is actuated to effect chuck opening without altering the setting of the mechanism for effecting predetermined work-gripping pressures by the chuck.

It is also an object of the invention to provide a machine tool, having a work-gripping chuck and a power operated chuck actuating member driven through a friction clutch for operating said chuck to effect work-gripping and release, with a novel means to provide a range of predetermined clutch-engaging pressures thereby resulting in a corresponding range of work-gripping pressures of the chuck, the said mechanism also including a means for automatically increasing the clutch-engaging pressure when the member is actuated to effect chuck opening and without altering the setting of the mechanism for effecting a predetermined work-gripping pressure by the chuck.

Another object of the invention is to provide a power operated chuck-actuating mechanism of the type defined in any of the preceding objects with a means to indicate the corresponding work-engaging pressures exerted by the chuck of the machine tool.

The invention further resides in certain novel features of construction and combination and arrangements of parts, and further objects and advantages thereof will be apparent to those skilled in the art to which it pertains from the following description of the present preferred embodiment, and a modification thereof, described with reference to the accompanying drawings in which similar reference characters represent corresponding parts in the several views and in which:

Figure 1:
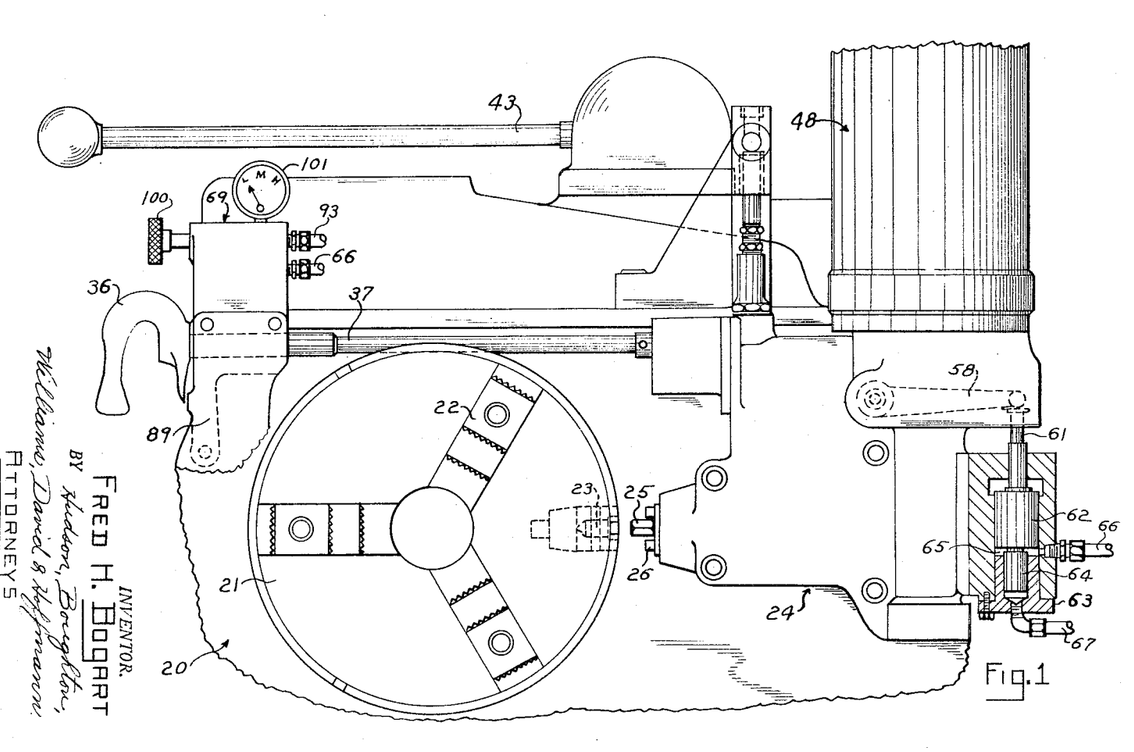
Fig. 1 is a fragmentary end view of the headstock of a machine tool provided with a work-gripping chuck and a power-operated chuck actuating mechanism in the form of a wrench embodying the present invention, the view being in elevation except for a portion of the wrench housing which is broken away to show the novel fluid-pressure-actuated pistons for effecting engagement of the clutch of the power wrench.

In Fig. 1 of the drawings there is illustrated a portion of a machine tool of conventional type comprising a headstock 20 mounted upon a suitable base and provided with a chuck 21 which is carried by the work spindle in the conventional manner. The chuck illustrated is of the universal type having radially movable jaws 22 capable of either externally or internally gripping a workpiece, the jaws being operated by a rotatable member inserted into a suitably shaped opening 23 of which one or more may be provided at suitably spaced points about the periphery of the chuck, only one being here illustrated. The chuck mechanism is conventional and hence need not be described in detail.

Adjacent the chuck 21 and preferably to the rear thereof as viewed from the front of the machine, i. e., from the left of Fig. 1, there is mounted a power-operated chuck actuating unit generally designated 24 which may be attached to the headstock of the machine tool by any suitable means. This power-operated chuck actuating unit comprises a rotatable member or wrench spindle 25, the outer end of which may be polygonally shaped and/or provided with spaced tongues 26 for engagement with correspondingly shaped recesses in an operating member located in the opening 23 of the chuck, the engagement being effected by axially moving the said rotatable member or wrench spindle 25 when the latter is aligned with the opening 23.

Figure 5:
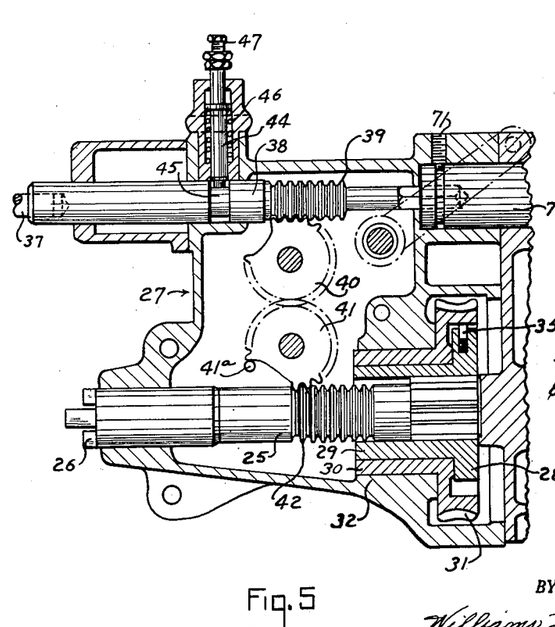
Fig. 5 is a fragmentary view, partly in section and partly in elevation, showing the mechanism for rotating the spindle of the chuck wrench and for axially moving the latter and also showing the rotary control valve which is actuated by the wrench-operating handle.

The wrench spindle 25 is slidably and rotatably supported within suitable bosses provided in the housing 27 of the chuck wrench unit 24, see Fig. 5, and a lost-motion disk 28 is splined or otherwise suitably connected with a portion of the wrench spindle for rotating the latter, the disk being restrained from axial movement with the wrench spindle by any suitable means. As shown in Fig. 5, the wrench member or spindle 25 extends through a sleeve-like extension 29 of the disk 28, this extension being journalled within a similar sleeve-like extension 30 of a worm gear 31, the latter sleeve being journalled within a suitable cylindrical portion or boss 32 of the housing 27. The inner periphery of the worm gear 31 is provided with an inwardly extending lug 33 which is adapted to cooperate with an outwardly extending segmental portion 34 provided upon the lost-motion disk 28, see Fig. 8. The disk 28 is also provided with a spring pressed plunger 35 mounted to extend radially outwardly from the disk and to engage the internal surface of the worm gear 31 as will be seen from Fig. 5.

The construction just described is such that the friction between the plunger 35 and the worm wheel 31 is sufficient to cause these members to rotate together when the worm wheel 31 is rotated and no appreciable resistance is offered to the rotation of the spindle 25. However, as soon as appreciable resistance is offered to rotation of the spindle 25, the worm wheel rotates relative to the disk 28 until the lug 33 engages one side face of the segmental portion 34, the spindle 25 then being rotated through a metal-to-metal contact so there is no further lost motion between the worm gear and the disk 28. When the worm gear is rotated in a direction to move the lug and segmental portions 33 and 34 out of engagement and resistance is offered to rotation of the spindle 25, the worm gear makes a partial revolution before engaging the other side of the lug 33 with the adjacent face of the segmental portion 34 of the disk 28 thereby producing a relatively sharp blow upon the latter for a purpose hereinafter described.

Figures 3, 4:
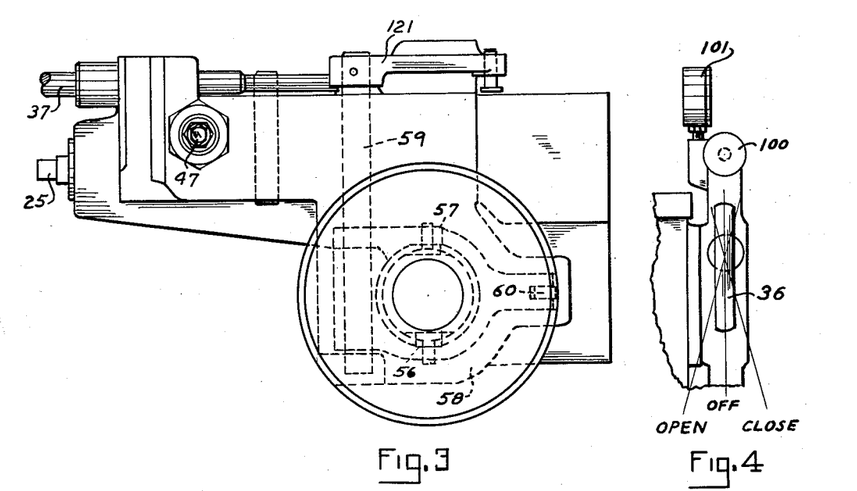
Fig. 3 is a detached top plan view of the power wrench mechanism illustrated in Fig. 1.
Fig. 4 is a fragmentary front elevational view of a portion of a machine tool illustrated in Fig. 1 and showing the operating handle of the power wrench and the adjustable control for regulating the pressure with which the friction clutch of the wrench is engaged.

The wrench spindle 25 is moved axially to and from engagement with the chuck operating member in the opening 23 of the chuck 21 by means of an operating handle 36 which is connected on the outer end of a rod 37, the latter being rotatably and slidably mounted in, and extending through, a housing 89 which is connected with a portion of the headstock so that the handle is conveniently located adjacent the forward face of the headstock, as will be seen in Figs. 1 and 4. The inner end of the rod 37 is connected with a rod-like member 38 which is slidably and rotatably journalled within a portion of the housing 27. This member 38 is provided, intermediate its ends, with a circular rack 39 which cooperates with segmental intermeshing pinions 40 and 41, the latter cooperating with a circular rack 42 provided on the wrench spindle 25.

It will be understood that with the parts positioned as illustrated in Figs. 1 and 5, the handle 36 and rod 37 are located at their innermost positions so that the rack 39, pinions 40, 41 and rack 42 have retracted the wrench portion of the spindle 25 from engagement with the chuck, movement in this direction being limited by engagement of one end of the chordal portion of pinion 41 with an abutment member or pin 41a. When the handle 36 is pulled outwardly, the rack 39 partially rotates or rocks the pinions 40, 41 thereby causing the latter to move the wrench spindle 25 outwardly and into engagement in the opening 23 of the chuck, movement in this direction being limited by engagement of the other end of the chordal portion of pinion 41 with the abutment pin 41a.

In order that this engagement of the wrench spindle with the chuck may not be effected when the chuck spindle and chuck are rotating, an interlock is provided between the wrench spindle mechanism and the main control lever 43 for the headstock mechanism. This interlock comprises a spring-pressed plunger 44 positioned to cooperate with a circular groove 45 in the member 38, the spring 46 which surrounds the plunger 44 and acts upon a collar thereof normally tending to withdraw the plunger from engagement with the groove so that the member 38 is free to move. The upper portion of the plunger 44 is provided with an adjustment screw 47, the upper end of which is adapted to be engaged by a member operated by the control lever 43 so that when the control lever 43 is positioned for effecting rotation of the chuck, the plunger 44 is depressed to position the lower end thereof in the groove 45 and prevent actuation of the wrench spindle into engagement with the chuck. In the event that the wrench spindle is inadvertently left in engagement with the chuck and an attempt be made to actuate the control lever 43 to initiate rotation of the chuck, this attempt is ineffectual since the lower end of the plunger 44 will not enter into the groove 45, the latter then being out of alignment with the plunger, and hence the control lever 43 cannot be operated sufficiently to initiate rotation of the chuck.

Figure 8:
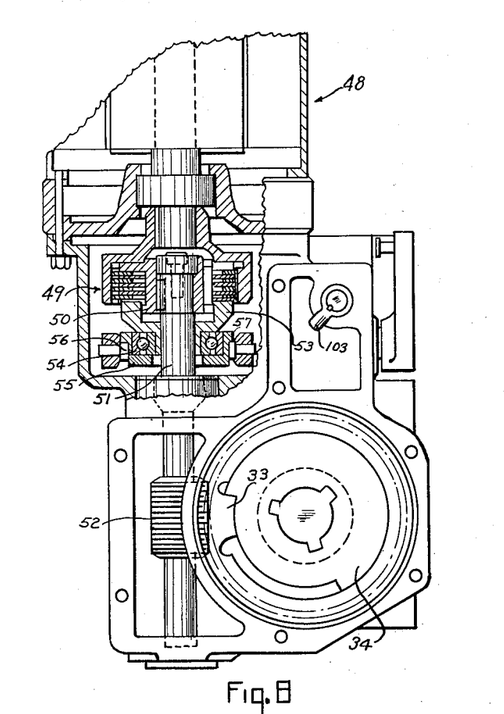
Fig. 8 is a fragmentary rear view of the power chuck wrench, the rear cover plate being removed and a portion of the upper housing being broken away with parts in the latter shown in section to more clearly illustrate the clutch and the actuating lever thereof.

Rotation of the wrench spindle 25 is effected through the previously mentioned worm gear 31 and lost-motion disk 28 by means of a reversible electric motor, generally designated 48, the armature shaft of which is connected to one set of disk plates or friction members of a friction clutch 49, see Fig. 8. The other set of disk plates or friction members of the clutch is connected with the driven member 50 of the clutch which is keyed to a worm shaft 51 journalled in the housing 27. This shaft 51 is provided with a worm 52 cooperating with the previously mentioned worm wheel 31 for rotating the wrench spindle 25. The clutch herein illustrated and the mechanism about to be described are so constructed that the clutch disks or friction members are engaged with a substantially uniform pressure of preselected value, when the control handle is operated in a direction to actuate the chuck to work-gripping position, thereby providing a uniform preselected torque for the wrench spindle, even though the friction members of the clutch have become worn. Hence, the jaws of the chuck 21 may be actuated to work-gripping position by a predetermined force which is readily adjustable to provide work-gripping pressures of desired values for different types of stock. When the control handle 36 is operated in a direction to produce work release, the lost-motion connection provided by the segmental portion 34 and the lug 33 supplies a hammer-like blow to initially loosen the jaws of the chuck from the work gripped thereby and, in addition, as will hereinafter appear, mechanism is provided for automatically increasing the pressure with which the friction clutch 49 is engaged when the power wrench unit is operated in a direction to effect disengagement of the chuck jaws from the work so that a greater torque is available for this operation. This automatic increase of torque transmission acts only when the chuck is being operated in work-releasing direction and does not alter the predetermined torque transmitted by the clutch when the power wrench unit is again operated to effect work gripping.

Engagement of the plates or friction members of the clutch 49 is effected by member 53 which is slidably mounted upon the worm shaft 51 and has an integral, outwardly extending, annular portion surrounding the member 50, the outer face of the annular member being adapted to engage the friction members of the clutch and exert pressure thereon. For this purpose, the member 53 has a reduced diameter surface on which is mounted the inner race of an anti-friction bearing 54, the outer race of the bearing being received in a collar 55. The collar 55 is provided with diametrically opposed slots or recesses which receive a pair of shoes 56 and 57, the latter being pivoted on the arms of a forked lever 58 intermediate the ends of the latter, see Figs. 3 and 8. The ends of the forked arms of the lever 58 are keyed to a shaft 59 which is rotatably journalled within a portion of the housing 27. The other end of the lever 58 comprises a single arm which is bifurcated and has a roller 60 rotatably supported within the bifurcation. This roller is adapted to be engaged by a vertically movable plunger 61 to effect rocking of the lever 58 and thereby cause the members 55 and 53 of the clutch to exert a clutch-engaging pressure upon the friction members of the clutch. In accordance with the form of the invention illustrated in Figs. 1 through 10, engagement of the clutch to effect a preselected torque transmission corresponding to a desired work-gripping pressure of the chuck, as well as the means for increasing the torque transmission when the chuck is operated to open position, are effected by fluid-pressure operated means cooperating with the roller 60 of the lever 58.

Figure 2:
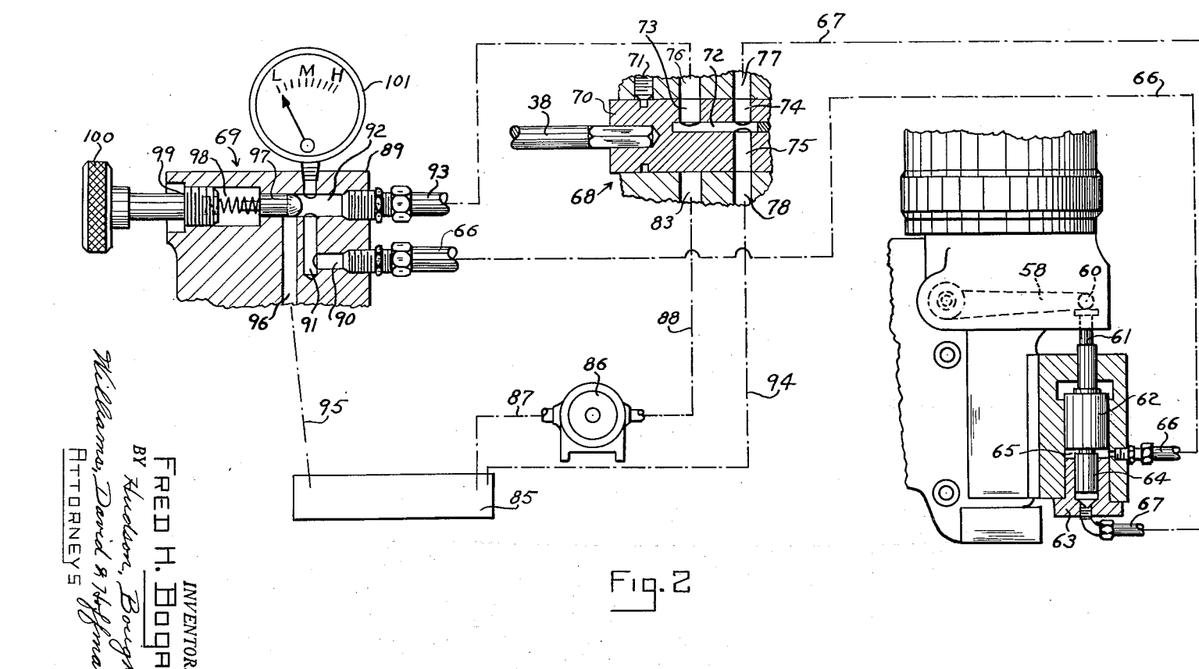
Fig. 2 is a somewhat schematic view, partly in section and partly in elevation, illustrating the novel fluid-pressure means for actuating the power wrench.

As shown in Figs. 1 and 2, the roller 60 of lever 58 rests upon the upper end of a piston rod or plunger 61, the lower end of which is integral with or connected to a piston member 62 slidable within a cylinder formed within a portion of the housing 27. The lower portion of the cylinder for the piston 62 is provided with a cap member 63 which has a cylindrical portion extending within the said cylinder and provided with a bore forming a cylinder for a second piston 64, the latter being integral with or attached to the piston 62 and of smaller diameter than piston 62. As shown in Figs. 1 and 2, the pistons and cylinders are so constructed that an annular chamber 65 is provided intermediate the lower face of the piston 62 and the upper face of the inwardly extending portion of the cap member 63, thus providing a chamber for fluid pressure intermediate the pistons 62 and 64 when the latter are in their lowermost positions.

A conduit 66 communicates with the annular chamber 65 for supplying fluid under pressure thereto. A second conduit 67 is connected to an aperture in the outer end of the cap member 63 to supply fluid under pressure to the cylinder in the cap member and below the piston 64. The control of flow of fluid under pressure through the conduit 67 is effected by means of a rotary valve, generally designated 68, which is operated by the power wrench operating handle 36, while control of the flow of fluid under pressure to the conduit 66 is also controlled by the same rotary valve 68 and, in addition, by a pressure regulating mechanism generally designated 69, see Fig. 2.

As will be seen from Figs. 2 and 5, the rotary valve 68 comprises a core member 70 which is rotatably mounted within a portion of the housing 27 and restrained from axial movement by a set screw, or the like, 71 having a reduced inner end cooperating with a groove in the core member 70. The core member 70 is provided with a centrally disposed, longitudinally extending bore or opening of polygonal cross section in its forward portion in which a corresponding polygonal-shaped end of the member 38 is slidably received. It will be remembered that the member 38 is connected to the handle 36 by means of the rod 37 and, consequently, rocking or partial rotation of the handle 36 effects corresponding rocking or partial rotation of the valve core member 70, the longitudinal movement of the rod 37 to effect engagement and disengagement of the wrench spindle with the chuck being permitted by sliding of the polygonal-shaped end of the member 38 within the correspondingly shaped bore or opening in the core member 70.

Figure 6:
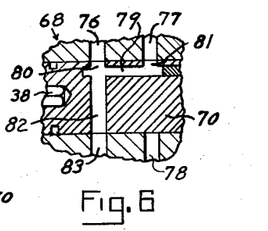
Fig. 6 is a fragmentary sectional view of a rotary control valve shown in Figs. 2 and 5 and illustrating the valve in its position for effecting work release or opening of the chuck.

The core member 70 is provided with an axially-extending passageway 72, both ends of which are closed. This passageway communicates with radially-extending passageways 73, 74, and 75 which are adapted to be simultaneously aligned, in one position of the core member, with ports 76, 77, and 78, respectively, formed in the valve casing which is a part of the housing 27. The core member 70 is also provided with a second axially-extending passageway 79, both ends of which are closed and which communicates with radially-extending passageways 80, 81, and 82, see Fig. 6. The passageways 80 and 81 are adapted to be simultaneously aligned with the previously-mentioned ports 76, 77, respectively, of the valve casing in a second position of the valve core and the passageway 82 is at the same time aligned with a port 83 in the casing or housing 27. In addition to these passageways, the valve core member 70 is further provided with a diametrically extending passageway 84 adapted to be aligned with the ports 76 and 83 in a third position of the valve member.

As will be seen from Fig. 2 of the drawings, the machine tool is provided with a sump or reservoir 85 for containing a suitable fluid which is to be supplied under pressure for actuating the pistons 62 and 64. Circulation and pressuring of the fluid is effected by connecting the inlet of a fluid pressure pump 86 to the reservoir 85 by a conduit 87, the outlet or pressure side of the pump being connected by a conduit 88 to the previously-mentioned port 83 of the valve 68. The conduit 66 which communicates with the chamber 65, intermediate the pistons 62 and 64, extends to and communicates with the fluid passageways in the housing 89 for the pressure regulator 69. As mentioned before, this housing is mounted upon the headstock 20 of the machine tool and provides the forward support for the rod 37 which is actuated by the operating handle 36.

The housing 89 is provided with intercommunicating bores or passageways 90, 91, and 92, the conduit 66 being connected with the passageway 90 and the passageway 92 being connected by a conduit or pipe 93 with the port 76 of the rotary valve 68. The port 77 of the rotary valve is connected to the conduit or pipe 67 which communicates with the cylinder in the cap member 63. A fluid return conduit 94 extends between the port 78 of the rotary valve and the reservoir 85 and a second return conduit 95 communicates a passageway 96 in the pressure regulator housing 89 with the reservoir 85. The upper end of the passageway 96 is selectively placed in communication with the passageway 92 through operation of a sliding valve member 97 which is disposed in the end of the passageway 92 opposite the connection therewith of the conduit 93. This valve member is urged inwardly of the passageway 92 by a coil spring 98, the compression of which may be varied by an adjustment screw 99 having a manually-operated knob 100 conveniently disposed adjacent the control handle 36.

Intermediate the valve member 97 and the conduit 93, the passageway 92 communicates with a fluid pressure indicator 101 which may be of suitable type such as a Bourdon gauge, the indicia of which preferably represent the pressure with which the jaws of the chuck grip the work stock. For example, the indicia may, as indicated in the drawings, be designated by the characters "L," "M," and "H," representing respectively "Light," "Medium," and "Heavy" gripping of the work.

The construction just described is such that when the control handle 36 is in its neutral or "off" position, as indicated in Fig. 4, the core member 70 of valve 68 is positioned as shown in Fig. 2. Hence, any fluid pressure existing within the system is exhausted to the reservoir 85 through the intercommunicating passageways 72, 73, 74, and 75 of the valve core, the passageways 90, 91, and 92 of the pressure regulator 69, and the interconnecting pipes or conduits.

Figure 7:
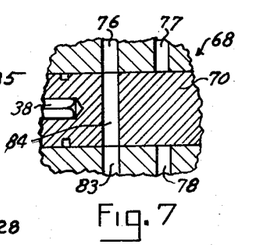
Fig. 7 is a fragmentary sectional view similar to Fig. 6 but showing the rotary valve in a different position which corresponds to that for effecting work-gripping or closing of the chuck.

When the control handle 36 is rotated to alignment with the position indicated "Close" in Fig. 4, the valve member 70 of the valve 68 is positioned as shown in Fig. 7, thus bringing the passageway 84 thereof into alignment with the ports 76 and 83. Hence, fluid is now withdrawn from the reservoir 85 and supplied under pressure by the pump 86 to the port 83 from whence it passes through the passageway 84, port 76, and conduit 93 to the passageway 92 of the pressure regulator. The fluid under pressure then continues through the passageways 91, 90 and conduit 66 into the chamber 65 and acts upon the lower face of the piston 62 moving the latter upward. Consequently, the piston rod or plunger 61 is moved upwardly rocking the lever 58 in an upward direction thereby exerting a clutch-engaging pressure upon the friction members of the clutch 49. The pressure thus exerted upon the friction members of the clutch is determined by the compression of the spring 98 in the pressure regulator 69 and as soon as the fluid pressure exerted upon the piston 62 reaches the desired predetermined value, the valve member 97 of the pressure regulator moves outwardly sufficiently to partly uncover the passageway 96 and any excess pressure developed in the system by the pump 86 is relieved back to the reservoir through the conduit 95. By adjusting the knob 100, the compression of the spring 98 may be selected to any desired value and the corresponding fluid pressure will be exerted upon the piston 62 with the result that the clutch-engaging pressure exerted upon the friction clutch 49 is proportional to this fluid pressure.

For any given clutch-engaging pressure the torque transmitted through the friction clutch to the wrench spindle 25 will have a corresponding predetermined value so that the chuck jaws are tightened upon the work until the pressure exerted by the jaws balances the torque transmitted by the clutch whereupon the friction members of the clutch will slip. Hence, the chuck jaws will not be tightened beyond a predetermined value which is directly proportional to the clutch-engaging pressure and hence to the fluid pressure applied to piston 62. As mentioned heretofore, the calibrations of the pressure gauge 101 are designated in accordance with the desired work-gripping pressures to be exerted by the jaws of the chuck and consequently the knob 100 is adjusted to compress the spring 98 until the indicating hand of the gauge 101 indicates the desired work-gripping pressure. Strictly speaking, the pressure indicated upon the gauge 101 is the fluid pressure utilized for clutch engagement but, as noted above, this is directly proportional to the torque transmitted through the friction clutch to the wrench spindle and hence proportional to the gripping pressure exerted by the jaws of the chuck.

Since the length of stroke of the piston 62 is independent of the fluid pressure applied thereto, any wear of the friction members of the clutch does not alter the operation of the device, because the piston 62 simply moves slightly farther under the predetermined fluid pressure exerted thereon. Hence, the friction members are always engaged with the same predetermined pressure whether new or worn with the result that the work-gripping pressure exerted by the jaws of the chuck is always accurately indicated and remains the same for any given setting of knob 100.

Opening of the jaws of the chuck is effected by rotating the control handle 36 in the opposite direction and to a position corresponding with that indicated "Open" in Fig. 4. This rotates the core member 70 of the rotary valve 68 to the position shown in Fig. 6 so that the fluid under pressure, delivered by the pump 86, now passes through the passageways 82, 80, 79, and 81 of the valve core member. The fluid under pressure delivered through the passageway 80 passes through the passageways of the pressure regulator 69, as described before in the case of closing of the chuck, thereby entering the chamber 65 of the clutch actuator through the conduit 66. The fluid under pressure delivered through the passageway 81 now passes through the port 77 and the conduit 67 entering the clutch actuator beneath the piston 64. Consequently, the plunger or piston rod 61 is now moved upwardly under the joint fluid pressures exerted upon the pistons 62 and 64 so that the lever 58 exerts a greater clutch-engaging pressure upon the friction members of the clutch 49 than was exerted to effect work-gripping. Therefore, the motor 48 can now transmit a greater torque to the wrench spindle 25 than was possible in the closing of the jaws of the chuck with the result that a greater force may be exerted upon the jaw-operating mechanism to effect opening of the jaws. This increased torque transmission does not, however, in any way affect the prior setting of the valve 97, which controls the predetermined pressure with which the jaws of the chuck are closed, and hence a new piece of stock may thereafter be gripped by the jaws with the same predetermined pressure as the stock which was just removed from the chuck without the necessity of altering the setting of the pressure regulator. In addition to the increased torque which may be exerted by the wrench spindle to effect work-release of the chuck, the lost-motion connection between the member 28 and the worm wheel 31 acts, as described above, to impart a hammer-like blow to the wrench spindle as its rotation in chuck-opening direction is initiated thus assisting the release of the jaws.

For the sake of simplicity, the description given above has been based upon the assumption that the spindle 25 of the chuck wrench was in engagement with the chuck for the several operations described. It will be understood, however, that during the normal operation of the apparatus, the wrench spindle is first axially moved into engagement with the chuck by pulling outwardly on the control handle 36, closing of the jaws of the chuck being then effected by the prior-mentioned rotation of the handle 36 to the position marked "Close" after which the handle is moved inwardly to its extreme inner position to retract the wrench spindle from the chuck. These axial movements of the handle 36 do not in any way interfere with the operation of the fluid pressure system since it will be remembered that provision is made for relative movement between the member 38 and the core member 70 of the valve due to the sliding of the former within the polygonal bore or opening of the latter. When the machining operation upon the workpiece has been completed and the jaws of the chuck are to be opened, the handle 36 is again pulled outwardly to engage the wrench spindle 25 with the chuck and the handle is rotated in the opposite direction, to that mentioned before, to the position marked "Open" thereby causing fluid pressure to be applied to both piston 62 and piston 64. Hence the clutch of the wrench mechanism is capable of effecting an increased torque transmission for actuation of the jaws of the chuck and the motor 48 is simultaneously energized for rotation in the reverse direction so that the chuck jaws are opened, releasing the work. After the jaws have been opened, the handle 36 may be again rotated to neutral position and moved inwardly to retract the wrench spindle from the chuck, or if a new piece of stock should be immediately machined, the wrench spindle may be left in engagement with the chuck and the handle simply rotated to effect closing of the jaws of the latter, after which the wrench spindle may be retracted as described above.

It will be apparent that the wrench spindle 25 must be rotated in opposite directions to effect opening and closing of the jaws of the chuck. For this purpose, the motor 48, as previously mentioned, is of the reversible type and the actuating mechanism for the power chuck wrench includes a pair of switches for controlling the direction of rotation of the motor. These switches S1 and S2 are mounted in spaced relationship upon the rear cover plate 102 of the lower portion of the power wrench housing 27, see Fig. 9, and extending between the switches for operation thereof is a rockable arm 103 which is connected for rocking movement with the core member 70 of the rotatable valve 68. The construction is such that, when the handle 36 is operated to position the valve 68 for effecting closing of the jaws of the chuck, the arm 103 engages the switch S1 and closes its contacts thereby energizing the motor 48 for rotation in the forward direction. When the control handle 36 is moved in the opposite direction, to effect opening of the jaws of the chuck, the core member 70 of the valve 68 is positioned by this operation to properly supply fluid pressure to the clutch actuator and, in addition, the arm 103 is moved to close the contacts of the switch S2 thereby energizing the motor 48 for rotation in the reverse direction. When the handle 36 is in the off or neutral position so that the valve 68 is positioned as shown in Fig. 2, the arm 103 is intermediate the switches S1 and S2 with the result that the contacts of both switches are open and the motor 48 is deenergized.

As mentioned before, the chuck here shown is of the universal type which may be employed to either grip work or stock internally or externally, internal gripping being effected by a radial outward movement of the jaws 22, while external gripping is effected by radial inward movement of the jaws 22. Consequently, the rotation of the wrench spindle 25 to effect external work gripping of a piece of stock must be the reverse of that for effecting internal work-gripping of stock. Likewise, the opening action of the jaws after internal gripping of a workpiece requires rotation of the wrench spindle in the opposite direction to that employed for opening the jaws when externally gripping a workpiece. In the absence of a special provision, this would necessitate that the operator actuate the handle 36 in one direction to effect closing of the chuck jaws for external gripping and in the opposite direction when effecting gripping of the work internally, and a corresponding difficulty would arise when the jaws were to be released from the work. In order to obviate this difficulty and enable the operator to always actuate the handle 36 in the same manner whether employing internal or external gripping of the work, a motor direction switch 104 is provided for reversing the direction of the motor in accordance with the manner in which the work is gripped.

Figure 9:
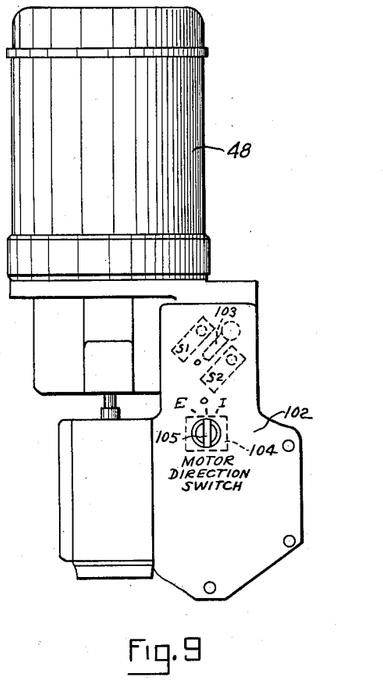
Fig. 9 is a detached, rear elevational view of the power chuck wrench illustrating the electrical control switches thereof.

The switch 104 is conveniently mounted upon the cover plate 102, as shown in Fig. 9, and is provided with four normally open contacts MDS1, MDS2, MDS3, and MDS4, which are adapted to be closed in pairs by manual operation of the knob 105 of the switch. Thus, when the knob 105 is positioned, as shown in Fig. 9, in alignment with the "O" indicium, all of the contacts of the switch are open. When the knob 105 is moved to align with the indicium marked "E," contacts MDS1 and MDS3 are closed, while the contacts MDS2 and MDS4 are open. This corresponds to the setting of the switch when the power chuck wrench is to effect operation of the chuck in a direction to cause external gripping of the stock or workpiece. Conversely, when the knob 105 is aligned with the indicia "I," contacts MDS2 and MDS4 are closed, while the contacts MDS1 and MDS3 are opened. This corresponds to the setting of the switch for operating the chuck to provide internal gripping of the stock.

Figures 10, 11, 12:
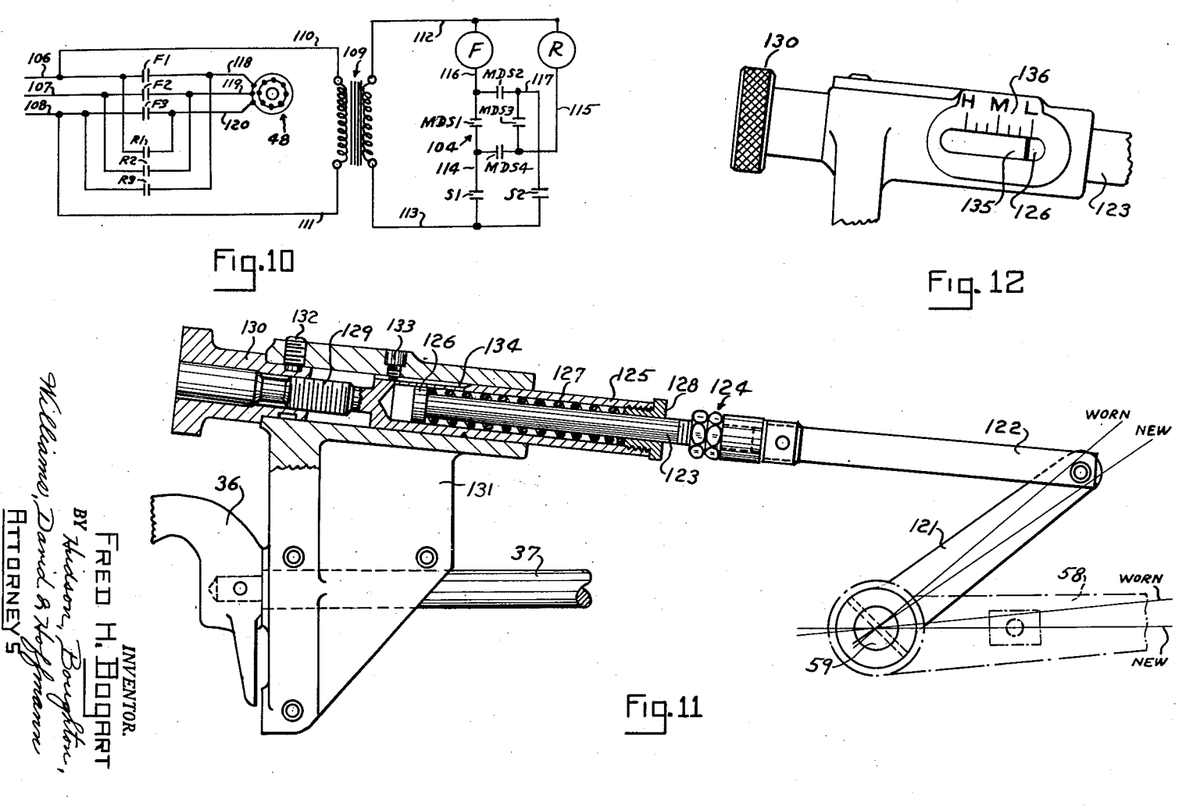
Fig. 10 is a simplified schematic wiring diagram of the electric circuit employed with the chuck wrench mechanism utilizing fluid-pressure-actuated means to effect clutch engagement.
Fig. 11 is a fragmentary detached view, partly in section and partly in elevation, illustrating a modified form of the invention for effecting engagement of the friction clutch of a power wrench to provide a range of work-engaging pressures for the chuck operated by the wrench and also illustrating the manner in which the mechanism automatically compensates for wear of the friction members of the clutch.
Fig. 12 is a detached, fragmentary side elevational view of the means provided in the mechanism illustrated in Fig. 11 for adjusting and indicating the work-gripping pressures exerted by the chuck.

A simplified electrical circuit for operating the motor 48 under control of the switches S1, S2, and 104 is illustrated in Fig. 10. As shown therein, 3-phase electrical current is supplied through the lines 106, 107, and 108. The lines 106 and 108 are connected to the primary of a transformer, generally designated 109, by the wires 110 and 111, the secondary of this transformer being connected to the wires 112 and 113 of the control circuit. This control circuit includes the previously-mentioned switches S1, S2, and 104 and two relays designated F and R, the contacts of the relays being interposed in the motor leads to control the energization of the motor 48 for rotation in forward and reverse directions, respectively. Thus, the relay F is connected between the wires 112 and 113 and in series with the contacts of switch S1 and the contacts MDS1 of switch 104. The wire 114 which extends between the contacts S1 and MDS1 is connected with one of the contacts MDS4, the other of these contacts being connected by a wire 115 to one terminal of the relay R, the second terminal of the latter relay being connected to the wire 112. The wire 116, which connects the contacts MDS1 with the relay F is also connected to one of the contacts MDS2, the other of these contacts being connected by a wire 117 to one of the pair of contacts S2 and the second contact of this latter pair being connected with the wire 113. The contacts MDS3 are connected between the wires 115 and 116. The relay F has three normally open contacts F1, F2, F3 which are interposed between the power supply wires 106, 107, 108 and the leads 118, 119, and 120 for the motor 48. The relay R likewise has three normally open contacts R1, R2, and R3. The contacts R1 are adapted to close a circuit from wire 106 to the lead 120 and the contacts R3 are adapted to close a circuit from the wire 108 to the lead 118, while the contacts R2 are simply bridged around the contacts F2. The operation of this circuit will be readily understood from the following summary of the mode of operation of the above described form of the invention.

Let it be assumed that a piece of work or stock is to be gripped externally by the chuck 21 with a grip of "light" pressure and that the knob 100 has been adjusted to suitably dispose the spring 98 and valve member 97 for such a pressure. The operator then positions the handle or knob 105 of switch 104 into alignment with the indicium "E" corresponding to external gripping by the chuck. The main control lever 43 is then placed in neutral position so that the safety interlock 44 is disengaged from the groove 45.

The operator then pulls outwardly on the handle 36 and turns the latter to align it with the indicium designated "Close". Pulling the handle 36 outwardly causes the circular rack 39 to rotate the pinions 40, 41 and hence move the wrench spindle 25 forwardly and into engagement with the operating member in the opening or recess 23 in the chuck. The rocking or turning movement of the handle 36 has caused the arm 103 thereon to close the contacts of switch S1. Since the motor direction switch 104 was previously moved to the position designated "E," its contacts MDS1 and MDS3 have also been closed. Therefore, a circuit is completed through the contacts of switch S1 and the now closed contacts MDS1 to energize the relay F which, in turn, closes the contacts F1, F2, F3 energizing the motor 48 for rotation in the forward direction.

The rotation of the handle 36 has also moved the core member 70 of the valve 68 to position the former so that fluid pressure is now supplied from the reservoir 85 through the passageway 84 of the valve to the pressure regulator 69 and from the latter to the annular chamber 65 beneath the piston 62. Consequently, the piston 62 is moved upwardly and exerts clutch-engaging pressure upon the friction members of clutch 49 through rocking of the lever 58. When the pressure exerted upon the friction members of the clutch balances the pressure of the fluid for which the regulator 69 was set, the valve member 97 moves against the force exerted by the spring 98 to uncover the passageway 96 and exhaust a portion of the fluid to the reservoir 85 so that the fluid pressure and, hence the clutch-engaging pressure, remains substantially constant at a value corresponding to that for effecting a work-gripping pressure of "light" value.

The rotation of the motor 48 is therefore transmitted by the friction clutch 49, thereby driving the wrench spindle 25 and hence tightening the jaws of the chuck. When the pressure exerted by the chuck jaws upon the work reaches a predetermined value corresponding to that designated as a "light" grip, the resistance to further tightening of the chuck jaws is greater than the torque that can be transmitted through the friction members of the clutch 49 under the action of the predetermined fluid pressure. Hence, the clutch begins to slip with the result that the jaws of the chuck are tightened only to the extent indicated upon the gauge 101, this value having been selected in accordance with the character of the work by the operator adjusting the knob 100.

Termination of the rotation of the wrench spindle indicates to the operator that the chuck has been properly tightened. He then rotates the handle 36 back to its neutral or "off" position and pushes on the handle to return the latter to its initial inward position. The partial rotation of the handle moves the arm 103 from engagement with switch S1 thereby opening its contacts and hence the circuit through the relay F, thus deenergizing the motor 48, while the inward movement of the handle disengages the wrench spindle 25 from the chuck. The rotation of the handle 36 to its neutral or "off" position also moves the core member 70 of the valve 68 to the position shown in Fig. 2 so that any fluid pressure within the system is relieved, the fluid flowing back to the reservoir 85.

The chuck may now be placed in rotation by operation of the main control lever 43 which, it will be remembered, actuates the interlock 44 into engagement with the groove 45 thus preventing inadvertent engagement of the wrench spindle with the chuck when the latter is rotated. After the machining operation or operations have been completed, rotation of the chuck is terminated by operation of the control lever 43, thus releasing the interlock between the plunger 44 and the groove 45.

The chuck wrench is now operated to actuate the jaws of the chuck to work-releasing position by manipulating the handle 36. That is to say, the operator now pulls outwardly on the handle 36, again actuating the circular racks 39, 42 and the pinions 40, 41, to move the wrench spindle 25 into engagement with the operating member in the opening 23 of the chuck. The handle 36 is then rocked or partially rotated to the left, as viewed in Fig. 4, into alignment with the position designated "Open." This causes the arm 103 to close the contacts of the switch S2 and this completes a circuit through the contacts S2 and the contacts MDS3 energizing the R relay which, in turn, closes the contacts R1, R2, and R3 energizing the motor 48 for rotation in the reverse direction.

The rotation of the handle 36 has also positioned the core member 70 of the valve 68 so that fluid pressure is now supplied through the passageways 80, 81, 82 of the latter to the pressure regulator 69 and also to the conduit 67. The portion of the fluid under pressure which passes through the regulator 69 is exerted, as before, upon the piston 62, while the fluid pressure passing through the conduit 67 now acts upon the piston 64. Consequently, the motor 48 has been energized for rotation in the direction which effects opening of the chuck jaws, and the clutch engaging pressure exerted upon the friction members of the clutch is increased over that which was exerted during closing movement of the chuck, the pressure now exerted upon the clutch being the sum of the pressures exerted upon the pistons 62 and 64 by the fluid pressure delivered thereto. Therefore, the clutch 49 will not slip even through greater force is required to open the jaws than to close them.

In addition to the greater torque transmitted by the clutch, the opening action is further assisted in its initial stage by the lost motion provided between the disk 28 and the worm gear 31. That is to say, the friction between the end of the plunger 35 and the worm gear 31 is insufficient to transmit sufficient torque for moving the worm gear when the jaws of the chuck are in closed position. Hence, the disk 28 moves rapidly around until one side of its segmental portion 34 strikes the adjacent side of the lug 33 on the worm gear, the relative motion between the disk 28 and the worm gear being such that this engagement is in the nature of a hammer-like blow, thus assisting the initial loosening of the jaws of the chuck and, thereafter, a positive drive is provided between the disk 28 and the worm gear 31 for further exerting torque in a direction for opening the jaws of the chuck. While the lost-motion connection will also produce a hammer-like blow when the mechanism is operating in a chuck-closing direction, the blow at this time occurs at the beginning of the closing movement before the jaws firmly engage the workpiece and hence this blow has no effect on the work-gripping pressure exerted by the chuck jaws.

After the jaws of the chuck have been opened sufficiently to release the work, the handle 36 is rotated back to its neutral or "off" position, thus moving the arm 103 to its position as shown in Fig. 9 with the result that the contacts of switch S2 are open, deenergizing the motor 48. This movement of the handle 36 has also returned the core member 70 of valve 68 to its position as shown in Fig. 2, thus relieving the fluid pressure which is acting upon pistons 62 and 64 by establishing a communication through the valve 68 to the reservoir 85 and cutting off the further supply of fluid under pressure from the said reservoir.

The wrench spindle may then be disengaged from the chuck if the machine tool is not to be used further, but if a different piece of work or stock is to be machined, the spindle may be left in engagement with the chuck, and the handle 36 simply rotated to the position marked "Close," whereupon the power wrench mechanism is operated as previously described to again close the jaws of the chuck until the pressure exerted thereby on the work or stock is equal to that indicated upon the gauge 101. This work-engaging pressure may be adjusted to any desired value by turning the knob 100 thereby regulating the compression of the spring 96 and correspondingly controlling the pressure of the fluid which is applied to the piston 62, since it will be remembered that any pressures in excess of the predetermined value are relieved to the reservoir 85 by movement of the valve member 97 which uncovers the passageway 96 of the pressure regulator. Since the force exerted upon the lever 58 by the fluid pressure acting upon the piston 62 is independent of the distance through which the piston moves, wear of the friction members of the clutch does not result in an alteration of the predetermined work-gripping pressure which the mechanism is adjusted to provide and, consequently, any given setting of the knob 100 will provide the same work-gripping pressures whether the friction members of the clutch 49 be new or worn.

When the new piece of work or stock has been chucked, the handle 36 is again rotated to its neutral or "off" position and then moved inwardly so that the motor 48 is at rest and the spindle 25 is disengaged from the chuck.

If the work or stock is such that it is to be internally gripped by the jaws of the chuck, the operator simply moves knob 105 of the motor direction switch 104 into alignment with the indicium "I," which results in a closing of the contacts MDS2 and MDS4, the contacts MDS1 and MDS3 now being opened. The operations of chucking and releasing a workpiece are then effected as before by the same type of movements of the handle 36, since the positioning of the motor direction switch 104 has established circuits so that the motor 48 is rotated in the proper direction for completing opening and closing of the jaws of the chuck. That is to say, when the handle 36 is now moved to effect closing of the jaws, the contacts of switch S1 are closed as before, but this now completes a circuit through the closed contacts MDS4 to energize the R relay, thereby closing the contacts R1, R2, R3 so that the motor 48 is rotated in a reverse direction or in the opposite direction to that in which it rotated when the motor was energized for closing the jaws of the chuck for external gripping of the workpiece. This positioning of the handle 36 also operates the core member 70 of valve 68 in the same direction as previously described for effecting closing of the jaws of the chuck so that fluid pressure is supplied to the annular chamber 65 and acts upon the piston 62 to engage the clutch 49 with the predetermined pressure, which is productive of the desired work-gripping pressure of the jaws of the chuck. Hence, the operation of this portion of the mechanism is not altered, even though the jaws of the chuck are now moved to internally grip the workpiece.

Similarly, rotation of the handle 36 to the "Open" position moves the arm 103 to close the contacts of switch S2 thereby completing a circuit through the now closed contacts MDS2 energizing the F relay and closing the contacts F1, F2, and F3 so that the motor 48 is energized for rotation in a forward direction, which is opposite to the direction in which it rotated to effect opening of the jaws of the chuck when the latter were employed for external gripping of the stock or workpiece. This movement of the handle 36 has also moved the core member 70 of valve 68 so that fluid pressure is now applied to both the piston 62 and the piston 64 with the result that the clutch engaging pressure is increased in the manner before described, and hence, the power chuck wrench operates to open the jaws of the chuck as before described, the only difference being that the direction of rotation of the spindle 25 has been reversed.

The operation of the motor direction switch 104 does not alter the operation of the remainder of the mechanism except for changing the direction of rotation of the motor, and, therefore, the handle 36 is always moved in the same direction whether the stock or workpiece is being gripped internally or externally. Consequently, the operator does not have to operate the handle 36 in any different manner regardless of the manner in which the chuck is gripping the work.

While the pistons 62 and 64 have been shown as connected together, it will be apparent that the operation is not changed if these be separate and disposed in independent cylinders. Moreover, if separate pistons in separate cylinders be employed, the pistons need not both act upon the lever 58 at the same point.

In Figs. 11 through 14 there is illustrated a modified form of actuating mechanism for a power chuck wrench employing a friction clutch of the type illustrated and described in conjunction with the embodiment shown in Figs. 1 through 10. Therefore, only so much of that mechanism is hereinafter again illustrated and described as will be necessary to an understanding of the operation of the modified construction. As will be seen in Fig. 11, the modified mechanism employs the same control handle 36 for controlling the operation of the power chuck wrench, this handle being manipulated in the same manner as was heretofore described. Instead of employing a fluid-pressure operated mechanism for effecting engagement of the friction members of the clutch 49 with predetermined pressures, however, the modified construction employs a combination of a spring and lever which are connected with the clutch-operating lever 58 to actuate the latter.

As shown in Fig. 11, the mechanism includes a lever arm 121 which is connected for rocking with the shaft 59 by means of a drive pin, set screw, or the like. The outer end of this arm 121 is pivotally connected with a pull rod or link 122 which is in turn adjustably connected with one end of a rod or plunger member 123, this connection being effected as shown in Fig. 11 by threading the end of the rod 123 into the threaded end of a socket provided on the link 122, suitable lock nuts such as 124 being provided to retain the members in adjusted position. The rod or plunger 123 extends into the bore of a tubular member 125 and the end of the portion of the rod or plunger 123, which is disposed within the member 125, has a collar or cylindrical flange 126 attached thereto or integral therewith. This collar or flange 126 forms an abutment for one end of a compression spring 127 which is disposed about rod or plunger 123, the other end of the spring abutting an apertured plug 128 threaded into the open end of the tubular member 125.

The end of the tubular member 125, opposite the end which is provided with the plug 128, is preferably closed and provided with a solid extension of reduced diameter, which has a screw thread 129 formed thereon. The threaded portion 129 is received in a threaded opening of an adjusting knob 130, the knob 130 being rotatably mounted in an aperture of a suitable support 131, connected with the head stock of the machine tool. The knob 130 is held against axial displacement by a set screw or the like 132, carried by the support 131, and having its inner end extending into a circular groove of the knob 130. The member 125 is slidably received within the opening of the support 131 in which the knob 130 is rotatable, the member 125, however, being held from rotation by means of a set screw or the like 133 which is provided in the support 131 and extends into a longitudinally extending slot or groove 134 in the member 125.

The construction is such that, when the knob 130 is rotated in one direction, the threaded portion 129 of the member 125 is drawn further into the threaded opening of the knob so that the spring 127 is further compressed between the plug 128 and the collar or flange 126. Rotation of the knob 130 in the opposite direction causes the member 125 to move in the opposite direction thus partially relieving the compression of the spring 127. It will be apparent, therefore, that this construction provides a means for varying the clutch-engaging pressure which the lever 58 exerts upon the friction members of the clutch 49, since adjustment of the knob 130 varies adjustment of the compression of the spring 127 which in turn acts upon the plunger 123, link 122, arm 121, and through the shaft 59 to rock the lever 58 in a clutch-engaging direction. By varying the adjustment of the knob 130 and hence the compression of the spring 127, the pressure with which the friction members of the clutch are engaged may be correspondingly varied, thereby regulating the torque transmitted through the clutch to the wrench spindle. This in turn varies the work-gripping pressure with which the jaws of the chuck can engage a workpiece.

It follows, therefore, that the position of the collar or shoulder 126 is indicative of the work-gripping pressure which the jaws of the chuck exert upon the work when operated by the wrench and, hence, a slotted opening is provided through the tubular portion of the member 125 and the support 131 so that the position of the collar or shoulder 126 may be visible, as is shown in Fig. 12. Preferably, indicia are placed along the slot in the support 131 for cooperation with the end of the collar or flange 126, these indicia designating the work-gripping pressures exerted by the chuck and hence bearing characters such as "H," "M," and "L," corresponding respectively with "heavy," "medium," and "light" work-gripping pressures of the chuck. Hence, if the knob 130 be adjusted to bring the collar or flange 126 adjacent the indicium "M," the spring 127 will be compressed sufficiently so that the resulting clutch-engaging pressure exerted by the lever 58 upon the clutch 49 will produce a torque transmission through the clutch productive of a medium work-gripping pressure by the jaws of the chuck.

When a spring is connected directly with the lever which moves the clutch plates to effect engagement thereof, wear of the friction members of the clutch 49 would result in inaccuracies in the work-gripping pressures exerted by the jaws of the chuck since such wear would reduce the force exerted by the spring for a given setting thereof thus reducing the torque transmitted by the clutch to effect tightening of the chuck jaws. This difficulty is obviated in the present construction by applying the force of the spring 127 to the lever 58 through an intermediate lever arm 121 and by inclining the latter at an acute angle with respect to the link 122 and the lever 58 so that the arm 121 and lever 58, in effect, constitute a bell crank lever. With such a construction, it will be apparent that, when wear of the friction members of the clutch has occurred, the center line of the lever 58, to effect proper clutch engagement will have moved from the position indicated by the center line marked "New" to the center line marked "Worn." This means that the spring 127 has had its compression slightly relieved and hence is not exerting as much force as when the friction members of the clutch were new. However, the arm 121 has likewise rocked from the position in which its center line is indicated "New" to the position indicated by its center line marked "Worn" and this has increased the effective length of the lever arm. This effective length is, by definition, the perpendicular distance between the pivot of the lever and the line of action of the force applied to the lever, and hence is the vertical distance between the centers of the shaft 59 and the pivotal connection of link 122 to arm 121. This distance has increased as the force of the spring decreases while the effective length of arm 58 has not materially changed, so that the resulting mechanical advantage of the organization remain substantially constant and hence the predetermined pressures exerted upon the friction members of the clutch are not appreciably altered by wear thereof.

Figure 13:
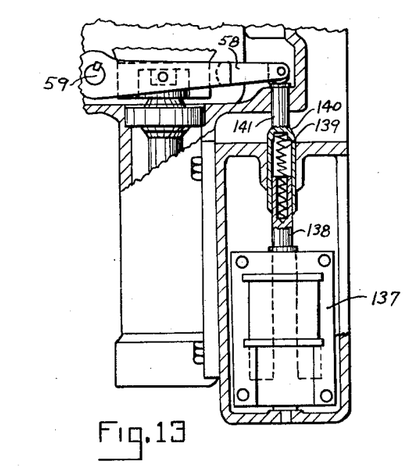
Fig. 13 is a fragmentary detached view, partly in section and partly in end elevation, of the novel electromagnetic means employed with the mechanism shown in Fig. 11 for increasing the clutch-engaging pressure when the power wrench is operated to open the jaws of the chuck.

In this embodiment of the invention, provision is likewise made for increasing the clutch-engaging pressure exerted by the lever 58 when the handle 36 is positioned to effect operation of power chuck wrench in the chuck-opening direction. In the present embodiment, this mechanism likewise operates upon the outer end of the lever 58 but comprises an electromagnet instead of a fluid-pressure operated device. As shown in Fig. 13, this electromagnet, generally designated 137, is mounted in the housing 27 of the power chuck wrench in a corresponding position with the previously-described, fluid-pressure actuated mechanism and the armature of the electromagnet is provided with a plunger 138, the outer end of which is bored to receive one end of a coil spring 139. Slidably disposed over the outer end of the plunger 138 is a hollow sleeve 140, the closed end of which forms the abutment for the upper end of the coil spring 139. The sleeve 140 is integral with, or connected to, a plunger portion 141 which cooperates with the roller 60 on the end of the lever 58. Consequently, when the electromagnet 137 is energized, the rod 138 acts through the spring 139 and the sleeve 140 to rock the lever 58 in a clutch-engaging direction, this force being added to that exerted by the spring 127 so that the clutch-engaging pressure exerted upon the friction members of the clutch is increased as is necessary to effect opening of the jaws of the chuck. The spring 139 is provided to compensate for the different extents of movement necessary to effect operation of the lever 58 due to wear of the friction members of the clutch so that the electromagnet is always operated for its full stroke regardless of the condition of the friction members in the clutch.

Figure 14:
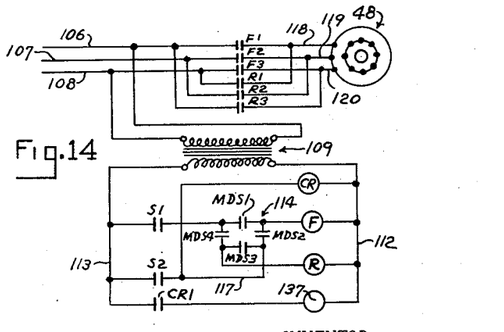
Fig. 14 is a simplified schematic wiring diagram of the electric circuit employed with the chuck wrench operating mechanism illustrated in Figs. 11 to 13.

Fig. 14 illustrates a simplified electrical circuit for use in conjunction with the embodiment of the invention illustrated in Figs. 11 through 13. This electrical circuit is substantially identical with that shown in Fig. 10 except for the addition of the electromagnet 137 and a relay CR for controlling operation of the electromagnet. Consequently, the parts which are identical with those in Fig. 10 bear the same reference numerals and need not be again mentioned in detail. Suffice it to note that the motor 48 is selectively connectable to the power supply lines 106, 107, 108 for rotation in a forward direction, through closing of the contacts F1, F2, F3, and for rotation in a reverse direction, through closing of the contacts R1, R2, and R3. As before, the contacts F1, F2, and F3 are actuated by the coil of the relay F, while the contacts R1, R2, and R3 are controlled by the coil of the relay R; these relay coils being connected in the control circuit together with the contacts of the switches S1, S2, and the contacts MDS1, MDS2, MDS3, MDS4 of the switch 104, in the same manner as previously described with respect to Fig. 10 and function in the same manner. The electromagnet 137 is selectively connectable with the power wires 112, 113 of the control circuit through the normally open contacts CR1. These contacts CR1 are operated by the coil of the CR relay, which coil is connected between the wires 117 and 112 of the control circuit so that its energization is under the control of the contacts of switch S2 and is therefore energized when the control handle 36 is operated to effect opening of the chuck.

The operation of this form of the invention may be summarized as follows:

Let it be assumed that a piece of work or stock is to be gripped externally by the chuck with a grip of light pressure. The operator first turns the knob 130 until the collar or flange 126 is properly aligned with the "L" indicium, thus indicating that the compression of the spring 127 has been adjusted to effect sufficient force through the link 122, and lever arms 121 and 58 to exert a clutch-engaging pressure upon the friction members of the clutch of a value such that the latter will transmit sufficient torque to tighten the jaws of the chuck upon the work with a light gripping pressure and the friction members will slip when this work-gripping pressure has been reached. After adjusting the knob 130, the operator next positions the control handle or knob 105 of switch 104 into alignment with the indicium "E" corresponding to external gripping by the chuck. The main control lever 43 is then placed in neutral position so that the safety interlock 44 is disengaged from the groove 45.

The operator then pulls outwardly on the handle 36 and turns the latter to align it with the indicium designated "Close" in Fig. 4. Pulling the handle 36 outwardly causes the circular racks 39, 42 and the cooperating segmental pinion 41, 40 to move the wrench spindle 25 forwardly and into engagement with the operating member in the opening or recess 23 in the chuck. The rocking movement of the handle 36 has caused the arm 103 thereon to close the contacts of switch S1. Since the motor direction switch 104 was previously moved to the position designated "E," its contacts MDS1 and MDS3 have also been closed. Therefore a circuit is completed through the contacts of switch S1 and the now closed contacts MDS1 to energize the relay F which in turn closes the contacts F1, F2, F3 energizing the motor 48 for rotation in the forward direction.

This rotation of the motor is transmitted by the friction clutch 49, which is held in engagement under the predetermined pressure exerted by the spring 127, thereby driving the wrench spindle 25 and hence tightening the jaws of the chuck. When the pressure exerted by the chuck jaws upon the work reaches the predetermined value corresponding to that designated as a "light" grip, the resistance to further tightening of the jaws of the chuck is greater than the torque that can be transmitted through the friction members of the clutch 49 so that the latter begins to slip and the termination of the rotation of the wrench spindle indicates to the operator that the chuck has been properly tightened. He then rotates the handle 36 back to its neutral position and pushes on the handle to return the latter to its initial position. The partial rotation of the handle moves the arm 103 from engagement with switch S1 thereby opening its contacts and hence the circuit through the relay F thus deenergizing the motor 48, while the inward movement of the handle disengages the wrench spindle 25 from the chuck. The chuck may now be placed in rotation by operation of the main control lever 43 which, it will be remembered, actuates the interlock 44 into engagement with the groove 45, thus preventing inadvertent engagement of the wrench spindle with the chuck when the latter is rotated.

After the machining operation has been completed, rotation of the chuck is terminated by operation of control lever 43, thus releasing the interlock between the plunger 44 and groove 45 and the chuck is operated to release the work by manipulating the handle 36. That is to say, the operator now pulls outwardly on the handle 36 again actuating the circular racks 39, 42 and the pinions 40, 41 to move the wrench spindle 25 into engagement with the operating member in the opening 23 of the chuck. The handle 36 is then rocked or partially rotated to the left as viewed in Fig. 4 into alignment with the position designated "Open." This causes the arm 103 to close the contacts of the switch S2 and this completes a circuit through the contacts S2 and the contacts MDS2 to energize the R relay which, in turn, closes the contacts R1, R2, and R3 energizing the motor 48 for rotation in the reverse direction. The closing of the contacts S2 has also completed a circuit energizing the relay CR, causing the latter, in turn, to close its contacts CR1, thereby energizing the electromagnet 137.

Consequently, the motor 48 is energized for rotation in the direction which effects opening of the chuck jaws and the clutch-engaging pressure exerted upon the friction members of the clutch is increased by the operation of the electromagnet 137 which acts upon the outer end of the clutch-engaging lever 58. Therefore, the clutch 49 is now engaged by a pressure which is the sum of the pressures exerted by the spring 127 and that exerted by the electromagnet 137 so that the clutch will not slip even though greater force is required to open the jaws than to close them. In addition the opening action is further assisted in its initial stage by the lost motion provided between the disk 28 and the worm gear 31. That is to say, the friction between the end of the plunger 35 and the worm gear 31 is insufficient to transmit sufficient torque for moving the worm gear 31 when the jaws of the chuck are in closed position. Hence, the disk 28 moves rapidly around until one side of its segmental portion 34 strikes the adjacent side of the lug 33 on the worm gear, the relative motion between the disk 28 and the worm gear being such that this engagement is in the nature of a hammer-like blow, thus assisting the initial loosening of the jaws of the chuck, and thereafter a positive drive is provided between the disk 28 and the worm gear 31 for further exerting torque in a direction for opening the jaws of the chuck.

After the jaws of the chuck have been opened sufficiently to release the work, the handle 36 is rotated back to its neutral or "off" position, thus moving the arm 103 to its position as shown in Fig. 9, with the result that the contacts of switch S2 are opened, deenergizing the electromagnet 137 and the motor 48. The wrench spindle may be then disengaged from the chuck if the machine tool is not to be used further, but if a different piece of work or stock is to be machined, the spindle may be left in engagement with the chuck and the handle 36 simply rotated to the position marked "Close," whereupon the power wrench mechanism will operate as previously described to again close the jaws of the chuck until the pressure exerted thereby on the work or stock is equal to that indicated upon the indicia 136. This pressure may be adjusted to any desired value by turning the knob 130, and the jaws of the chuck will grip the work with a pressure having the value indicated upon the indicia even though the friction members of the clutch have become worn. When the new piece of work or stock has been chucked, the handle 36 is again rotated to its neutral or "off" position and then moved inwardly so that the motor 48 is at rest and the spindle 25 is disengaged from the chuck.

If the work or stock is such that it is to be internally gripped by the jaws of the chuck, the operator simply moves knob 105 of the motor direction switch 104 into alignment with the indicium "I" which results in a closing of the contacts MDS2 and MDS4, the contacts MDS1 and MDS3 now being open. The operations of chucking and releasing a workpiece are then effected as before by the same type of movements of the handle 36, since the positioning of the motor direction switch 104 has established circuits so that the motor 48 is rotated in the proper direction for causing opening and closing of the jaws of the chuck.

That is to say, when the handle 36 is now moved to effect closing of the jaws the contacts of switch S1 are closed as before, but this now completes a circuit through the now closed contacts MDS4 to energize the R relay, thereby closing the contacts R1, R2, R3 so that the motor 48 is rotated in a reverse direction or in the opposite direction to that in which it rotated when the motor was energized for closing the jaws of the chuck for external gripping of the workpiece. Similarly, rotation of the handle 36 to the "Open" position moves the arm 103 to close the contacts of switch S2, thereby completing a circuit through the now closed contacts MDS2, energizing the F relay and closing its contacts F1, F2, and F3 so that the motor 48 is energized for rotation in the forward direction which is opposite to the direction in which it rotated to effect opening of the jaws of the chuck when the latter were employed for external gripping of the stock or workpiece. The operation of the motor direction switch 104 does not alter the operation of the CR relay and consequently the electromagnet 137 is energized, as before, when the handle 36 causes closing of the contacts S2 so that the electromagnet 137 effects an increase in the engaging pressure of the friction members of the clutch 49 when the power wrench is energized to effect opening of the chuck jaws.

It will be readily understood that the mechanisms illustrated and described with respect to both the preferred embodiment and the modification thereof illustrated in Figs. 11 through 14 may be varied or altered in many respects by those skilled in the art after having had the advantages of applicant's teachings and consequently these descriptions and illustrations are simply to be considered as illustrations of practical embodiments of the invention and not as limitations thereof.

Having thus described the invention, I claim:

1. In a machine tool having a chuck, power driven means including a friction clutch for operating the jaws of the chuck, and means to selectively effect operation of said power driven means in reverse directions productive respectively of work-gripping and work-releasing action of the jaws of the chuck; the improvement which comprises means operatively associated with said clutch exerting a substantially constant predetermined clutch-engaging pressure on said clutch when the power means is operated to transmit force to the jaws of said chuck in a work-gripping direction so that the clutch transmits a substantially constant torque for actuating the jaws of the chuck and slips when said torque is exceeded thereby causing the chuck jaws to grip the work with a predetermined pressure, and means operatively associated with said clutch automatically increasing the clutch-engaging pressure when the power means is operated to transmit force to the jaws of said chuck in a work-releasing direction so that the clutch transmits a greater torque for releasing the chuck jaws from the work.

2. In a machine tool having a chuck, power driven means including a friction clutch for operating the jaws of the chuck, and means to selectively effect operation of said power driven means in reverse directions productive respectively of work-gripping and work-releasing action of the jaws of the chuck; the improvement which comprises means operatively associated with said clutch exerting a substantially constant predetermined clutch-engaging pressure on said clutch when the power means is operated to transmit force to the jaws of said chuck in a work-gripping direction so that the clutch transmits a substantially constant torque for actuating the jaws of the chuck and slips when said torque is exceeded thereby causing the chuck jaws to grip the work with a predetermined pressure, and means operatively associated with said clutch and actuated by said selective means for increasing the clutch-engaging pressure when the selective means is positioned to effect operation of said power means in the direction which moves the jaws of the chuck to work-releasing position so that the clutch transmits a greater torque for releasing the chuck jaws from the work.

3. In a machine tool having a chuck, power driven means including a friction clutch for operating the jaws of the chuck, and means to selectively effect operation of said power driven means in reverse directions productive respectively of work-gripping and work-releasing action of the jaws of the chuck; the improvement which comprises means for exerting a substantially constant predetermined clutch-engaging pressure on said clutch when the power means is operated to transmit force to the jaws of said chuck in a work-gripping direction so that the clutch transmits a substantially constant torque for actuating the jaws of the chuck and slips when said torque is exceeded thereby causing the jaws of the chuck to grip the work with a predetermined pressure, means to adjust the clutch-engaging pressure to provide a range of work-gripping pressures, and means actuated by said selective means for automatically increasing the clutch-engaging pressure when the power means is operated to transmit force to the jaws of said chuck in a work-releasing direction so that the clutch transmits a greater torque for releasing the chuck jaws from the work.

4. The combination as defined in claim 3 and further comprising means to indicate the work-gripping pressure exerted by the jaws of said chuck.

5. The combination as defined in claim 3 and further comprising means responsive to the means for exerting the clutch-engaging pressure for work-gripping actuation of the chuck jaws to indicate the resulting work-gripping pressure exerted by the jaws of said chuck.

6. In a machine tool having a chuck, power driven means including a friction clutch for operating the jaws of the chuck, and means to selectively effect operation of said power driven means in reverse directions productively of work-gripping and work-releasing action of the jaws of the chuck; the improvement which comprises means for exerting a substantially constant predetermined clutch-engaging pressure on said clutch when the power means is operated to transmit force to the jaws of said chuck in a work-gripping direction so that the clutch transmits a substantially constant torque for actuating the jaws of the chuck and slips when said torque is exceeded thereby causing the chuck jaws to grip the work with a predetermined pressure, and fluid-pressure actuated means for automatically increasing the clutch-engaging pressure when the power means is operated to transmit force to the jaws of said chuck in a work-releasing direction so that the clutch transmits a greater torque for releasing the chuck jaws from the work.

7. In a machine tool having a chuck, power driven means including a friction clutch for operating the jaws of the chuck, and means to selectively effect operation of said power driven means in reverse directions productive respectively of work-gripping and work-releasing action of the jaws of the chuck; the improvement which comprises fluid-pressure actuated means operatively associated with said clutch exerting a substantially constant predetermined clutch-engaging pressure on said clutch when the power means is operated to transmit force to the jaws of said chuck in a work-gripping direction so that the clutch transmits a substantially constant torque for actuating the jaws of the chuck and slips when said torque is exceeded thereby causing the chuck jaws to grip the work with a predetermined pressure, and means for automatically increasing the clutch-engaging pressure exerted by said fluid pressure actuating means when the power means is operated to transmit force to the jaws of said chuck in a work-releasing direction.

8. The combination as defined in claim 7 and further comprising means to adjust the fluid pressure applied to said actuated means so that said power driven means is rendered effective to cause the jaws of said chuck to produce a corresponding range of work-gripping pressures.

9. The combination as defined in claim 7 and further comprising means to indicate the work-gripping pressure exerted by the jaws of said chuck.

10. In a machine tool having a chuck, power driven means including a friction clutch for operating the jaws of the chuck, and means to selectively effect operation of said power driven means in reverse directions productive respectively of work-gripping and work-releasing action of the jaws of the chuck; the improvement which comprises a first fluid-pressure actuated piston operatively connected with said clutch to exert a clutch-engaging pressure thereon, means to apply a predetermined fluid pressure to said first piston when the power means is operated to transmit force to the jaws of said chuck in a work-gripping direction, a second fluid pressure actuated piston operatively connected with said clutch and adapted to act in conjunction with said first-mentioned piston, and means for applying fluid pressure to said second-mentioned piston as well as to said first-mentioned piston when the power means is operated to transmit force to the jaws of said chuck in a work-releasing direction whereby the clutch-engaging pressure is increased so that the said clutch transmits a greater force to the jaws for effecting work-release than for effecting work-gripping.

11. The combination as defined in claim 10 and in which the means for applying a predetermined fluid pressure to said first piston includes a fluid pressure regulator for maintaining the fluid pressure substantially constant, and means to adjust the said pressure regulator to vary the pressure of the fluid applied to said first piston and thereby provide a range of clutch-engaging pressures.

12. The combination as defined in claim 11 and further comprising means responsive to the fluid pressure supplied to said first-mentioned piston for indicating the resulting work-gripping pressure exerted by the jaws of said chuck.

13. In a machine tool having a chuck, power driven means including a friction clutch for operating the jaws of the chuck, and means to selectively effect operation of said power driven means in reverse directions productive respectively of work-gripping and work-releasing action of the jaws of the chuck; the improvement which comprises a first fluid-pressure actuated piston operatively connected with said clutch to exert a clutch-engaging pressure thereon; means to apply a predetermined fluid pressure to said first-mentioned piston including a source of fluid under pressure, a conduit for conducting the fluid under pressure from said source to said piston and valve means in said conduit actuated by said selective means for selectively effecting application of fluid under pressure to said piston; a second fluid-pressure actuated piston operatively connected to said clutch and acting in conjunction with said first-mentioned piston; and a conduit connected with said valve means to selectively apply fluid pressure to said second-mentioned piston; the said valve means having passages therein so constructed and arranged that when the selective means is positioned to cause the power driven means to effect work-gripping operation of the chuck jaws fluid pressure is applied only to said first piston, and when the selective means is positioned to cause the power driven means to effect work-releasing operation of the chuck jaws fluid pressure is applied to both the first and second pistons.

14. The combination as defined in claim 13 and further comprising a fluid pressure regulating means in said first-mentioned conduit for maintaining the fluid pressure applied to said first piston substantially constant.

15. The combination as defined in claim 14 and in which said fluid pressure regulating means comprises a spring loaded valve controlling the flow of fluid under pressure through said conduit, and means to vary the force exerted by said spring to thereby provide a range of clutch-engaging pressures corresponding to a desired range of work-gripping pressures exerted by the jaws of said chuck.

16. In a machine tool having a chuck, power driven means including a friction clutch for operating the jaws of the chuck, and means to selectively effect operation of said power driven means in reverse directions productive respectively of work-gripping and work-releasing action of the jaws of the chuck; the improvement which comprises means for exerting a substantially constant predetermined clutch-engaging pressure on said clutch when the power means is operated to transmit force to the jaws of said chuck in a work-gripping direction so that the clutch transmits a substantially constant torque for actuating the chuck jaws and slips when said torque is exceeded thereby causing the chuck jaws to grip the work with a predetermined pressure, and electromagnetic means for automatically further increasing the engaging pressure exerted on said clutch when the power means is operated to transmit force to the jaws of said chuck in a work-releasing direction so that the clutch transmits a greater torque for releasing the chuck jaws from the work.

17. In a machine tool having a chuck, power driven means including a friction clutch for operating the jaws of the chuck, and means to selectively effect operation of said power driven means in reverse directions productive respectively of work-gripping and work-releasing action of the jaws of the chuck; the improvement which comprises lever means including a first arm having a portion acting upon the friction members of said clutch and adapted to exert clutch-engaging force thereon and a second arm disposed at an angle with respect to said first arm and connected to move therewith about a pivot intermediate the free ends of said arms, spring means operatively connected to said second arm for exerting a predetermined force thereon in a direction to effect clutch engagement by said first arm, the said arms and spring means being so arranged that the perpendicular distance between the pivot and the line of action of the spring means increases as the force exerted by said spring means decreases due to wear of the friction members of the clutch and means connected to said first arm and actuated by said selective means for automatically increasing the engaging pressure on said clutch when the selective means is positioned to effect operation of said power means in the direction which moves the jaws of the chuck in a work-releasing direction.

18. The combination as defined in claim 17 and further comprising means to vary the force exerted by said spring means to thereby vary the clutch-engaging pressure and hence the work-gripping pressure exerted by the jaws of the chuck, and means cooperating with said spring means to indicate the work-gripping pressure corresponding to the adjustment of said spring.

19. The combination as defined in claim 17 in which the said means connected to said first arm for increasing the clutch-engaging pressure is the armature of an electromagnet, and means actuated by operation of said selective means to selectively energize and deenergize said electromagnet.

20. In a machine tool of the type described, a work-gripping chuck, a power actuated wrench for operating said chuck, means to selectively effect engagement and disengagement of said wrench with said chuck and to control the direction of rotation of said wrench, a friction clutch in the power drive for said wrench, means to exert a substantially constant predetermined engaging pressure on said clutch so that the latter is effective to transmit a predetermined torque for producing a predetermined work-gripping pressure by the jaws of said chuck, and means controlled by said first-mentioned means to automatically increase the clutch-engaging pressure when the power wrench is operated in a direction for actuating the jaws of the chuck in a work-releasing direction.

21. The combination as defined in claim 20 in which the power for said wrench is provided by a reversible electric motor, and further comprising electrical switch means operated by said selective means for controlling the direction of rotation of said motor.

22. The combination as defined in claim 20 and in which the said chuck is adapted to effect either internal or external gripping of the work and the power for said wrench is provided by a reversible electric motor, an electrical circuit provided with switch means operated by said selective means for controlling the direction of rotation of said motor, and manually operated switch means in said circuit for conditioning the latter to effect rotation of said motor in the proper direction to actuate the jaws of said chuck for work-gripping or work-release by the same movements of said selective means whether the chuck be employed for internal or external gripping of the work.

23. In a machine tool of the type described, a work-gripping chuck, a power actuated wrench for operating said chuck, means to selectively effect engagement and disengagement of said wrench with said chuck and to control the direction of rotation of said wrench, a friction clutch in the power drive for said wrench, fluid-pressure actuated means operatively connected with said clutch to effect engagement of the friction members thereof, means controlled by the said first-mentioned means for applying a substantially constant fluid pressure to said fluid-pressure actuated means when said first-mentioned means is positioned for causing the power wrench to effect work-gripping by the jaws of the chuck so that the clutch transmits a substantially constant torque and slips when said torque is exceeded thereby causing the chuck jaws to grip the work with a predetermined pressure, and means rendered effective by said last-mentioned means to increase the fluid pressure applied to said actuated means when the first-mentioned means is positioned for causing the wrench to effect work-releasing operation of said chuck jaws.

24. The combination as defined in claim 23 and further comprising means to automatically regulate the pressure of the fluid applied to said actuating means when the said selective means is positioned to cause work-gripping operation of the jaws of the chuck, and means to adjust the said regulating means to vary the fluid pressure applied to said actuated means and thereby provide a range of clutch-engaging pressures corresponding to a desired range of work-gripping pressures of the chuck jaws.

25. In a machine tool of the type described, a work-gripping chuck, a power actuated wrench for operating said chuck, means to selectively effect engagement and disengagement of said wrench with said chuck and to control the direction of rotation of said wrench, a friction clutch in the power drive for said wrench, means to exert a substantially constant predetermined engaging pressure on said clutch so that the latter is effective to transmit a predetermined torque for producing a predetermined work-gripping pressure by the jaws of said chuck, and electromagnetic means controlled by said selective means to automatically increase the engaging pressure exerted on said clutch when the said selective means is positioned for causing the power wrench to actuate the chuck jaws in a work-releasing direction.

26. The combination as defined in claim 25 and in which the means for exerting a substantially constant predetermined engaging pressure on said clutch includes a first arm having a portion acting upon the friction members of said clutch, a second arm disposed at an angle with respect to said first arm and connected to move therewith about a pivot intermediate the free ends of said arms and spring means operatively connected to said second arm for exerting a predetermined force thereon in a direction to effect clutch engagement by said first arm, the said arms and spring means being so arranged that the perpendicular distance between the said pivot and the line of action of the spring means increases as the force exerted by said spring means decreases due to wear of the friction members of the clutch so that the clutch-engaging pressure remains substantially constant.

27. The combination as defined in claim 26 and further comprising means to vary the force exerted by said spring means to thereby provide a range of work-gripping pressures of said chuck jaws.

FRED H. BOGART.

REFERENCES CITED

The following references are of record in the file of this patent:

UNITED STATES PATENTS

| Number | Name | Date |
|---|---|---|
| 1,441,088 | Hofstetter | Jan. 21, 1923 |
| 1,534,572 | Cutler | Apr. 21, 1925 |
| 1,656,624 | Finsen | Jan. 17, 1928 |
| 1,831,225 | Bogart | Nov. 10, 1931 |
| 2,019,814 | Holmes et al. | Nov. 5, 1935 |
| 2,268,135 | Dornhofer | Dec. 30, 1941 |
| 2,288,034 | Somes | June 30, 1942 |
| 2,291,147 | Carlsen | July 28, 1942 |
| 2,362,146 | Mariotte | Nov. 7, 1944 |
| 2,366,908 | Jenkins | Jan. 9, 1945 |
| 2,451,705 | Adair | Oct. 19, 1948 |